(12) United States Patent
Nagayasu

(10) Patent No.: US 8,749,943 B2
(45) Date of Patent: Jun. 10, 2014

(54) DRIVE CIRCUIT FOR ELECTROMAGNETIC MANIPULATION MECHANISM

(75) Inventor: Ryo Nagayasu, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 150 days.

(21) Appl. No.: 13/576,614

(22) PCT Filed: Apr. 2, 2010

(86) PCT No.: PCT/JP2010/002423
§ 371 (c)(1),
(2), (4) Date: Aug. 1, 2012

(87) PCT Pub. No.: WO2011/125092
PCT Pub. Date: Oct. 13, 2011

(65) Prior Publication Data
US 2012/0292998 A1   Nov. 22, 2012

(51) Int. Cl.
*H01H 47/22* (2006.01)
*H01H 33/38* (2006.01)
*H01H 33/666* (2006.01)
*H02H 9/04* (2006.01)

(52) U.S. Cl.
CPC ............... *H01H 47/22* (2013.01); *H01H 33/38* (2013.01); *H01H 33/6662* (2013.01); *H02H 9/047* (2013.01)
USPC .......................................... 361/152; 361/166

(58) Field of Classification Search
CPC . H01H 47/226; H01H 33/38; H01H 33/6662; H02H 9/047
USPC ................................. 361/152, 166
See application file for complete search history.

(56) References Cited

U.S. PATENT DOCUMENTS

| 6,020,567 A | 2/2000 | Ishikawa et al. |
| 6,295,191 B1 * | 9/2001 | Kishida et al. ................ 361/139 |
| 6,882,515 B2 * | 4/2005 | Takeuchi et al. .............. 361/160 |

FOREIGN PATENT DOCUMENTS

| JP | 2002140966 A | 5/2002 |
| JP | 2002-216594 A | 8/2002 |

(Continued)

OTHER PUBLICATIONS

International Search Report (PCT/ISA/210) issued on Jun. 1, 2010, by the Japanese Patent Office as the International Searching Authority for International Application No. PCT/JP2010/002423.

(Continued)

*Primary Examiner* — Scott Bauer
(74) *Attorney, Agent, or Firm* — Buchanan Ingersoll & Rooney PC

(57) ABSTRACT

When a closing coil is excited with a charged capacitor by closing a switch to drive a movable core and to close a vacuum valve not shown, if switches are opened, no current flows even when a voltage is electromagnetically induced in a coil from the coil, and no power loss occurs. If a switch is closed before opening the switch, when the switch is opened, the current flowing through the coil commutates to a series circuit comprising a resistor, whereby a voltage generated in the coil can be suppressed. When the opening coil is excited with a capacitor by closing a switch to drive the movable core in the opposite direction to open the vacuum valve, if the switches are opened, no current flows even when a voltage is electromagnetically induced in the coil from the coil, and no power loss occurs.

3 Claims, 3 Drawing Sheets

(56) References Cited

FOREIGN PATENT DOCUMENTS

| | | |
|---|---|---|
| JP | 2004-288502 A | 10/2004 |
| JP | 2008-84718 A | 4/2008 |
| JP | 2010-92746 A | 4/2010 |

OTHER PUBLICATIONS

Office Action from Japanese Patent Office dated Jan. 15, 2013, issued in corresponding Japanese Patent Appln. No. 2008-262446, with English translation thereof (4 pages).

* cited by examiner

DRIVE CIRCUIT FOR ELECTROMAGNETIC MANIPULATION MECHANISM

TECHNICAL FIELD

The present invention relates to improvement of a drive circuit for an electromagnetic manipulation mechanism to open and close, for example, a vacuum valve of a vacuum circuit breaker.

BACKGROUND ART

According to a conventional drive circuit for an electromagnetic manipulation mechanism to open and close a vacuum valve of a vacuum circuit breaker, for example, electric current is passed through a closing coil and an opening coil which are provided on both ends of a rod-shaped movable core having a rectangular cross section, whereby the movable core is reciprocated to open and close switching contacts of the vacuum valve coupled to the movable core. The closing coil is connected via a discharge switch to a capacitor that has been charged, and when the discharge switch is closed, the main switching contacts are closed. When the contacts have been closed, the discharge switch is opened to interrupt the electric current flowing through the closing coil. In order to suppress a surge voltage generated at this time, a diode is connected to the closing coil in parallel. That is, when the electric current flowing through the closing coil is interrupted after circuit-making has been completed, i.e., after the main switching contacts have been closed, the electric current flowing through the closing coil is made to flow in a loop circuit composed of the closing coil and the diode (see Patent Literature 1, for example).

CITATION LIST

Patent Literature

Patent Literature 1; Japanese Laid-Open Patent Publication No. 2002-216594 (paragraph 0020 and FIG. 1)

SUMMARY OF THE INVENTION

Problems to be Solved by the Invention

In the case where two coils for closing and for opening are provided for a movable core, and a diode as described above is connected to each coil in parallel, when electric current is applied to one coil, an induced voltage is generated in the other coil to which no electric current is applied. Therefore, electric current flows in a loop circuit composed of the other coil, and the diode due to the induced voltage. Accordingly, power loss occurs in supplying energy from a capacitor to a coil at the time of closing or opening, i.e., at the time of excitation of the coil.

The present invention has been made to solve the above problem, and an objective of the present invention is to provide a drive circuit for an electromagnetic manipulation mechanism that can suppress power loss when a coil is excited.

Solution to the Problems

A drive circuit for an electromagnetic manipulation mechanism according to the present invention is a drive circuit for an electromagnetic manipulation mechanism that has a movable core coupled to an object to be driven and first and second coils to drive the movable core. The drive circuit comprises: first and second opening and closing switches for connecting the first and second coils to DC power supplies, respectively; a first overvoltage suppression circuit composed of a first series circuit connected to the first coil in parallel, the first series circuit being composed of a first parallel connection switch and a first resistor connected in series; and a second overvoltage suppression circuit composed of a second series circuit connected to the second coil in parallel, the second series circuit being composed of a second parallel connection switch and a second resistor connected in series. The movable core is driven to a first position through excitation of the first coil by closing the first opening and closing switch, and the movable core is driven to a second position through excitation of the second coil by closing the second opening and closing switch. The second parallel connection switch is opened when the first opening and closing switch is closed. The first parallel connection switch is opened when the second opening and closing switch is closed.

Effect of the Invention

According to the present invention, the drive circuit for an electromagnetic manipulation mechanism which has a movable core coupled to an object to be driven and first and second coils to drive the movable core comprises: first and second opening and closing switches for connecting the first and second coils to DC power supplies, respectively; a first overvoltage suppression circuit composed of a first series circuit connected to the first coil in parallel, the first series circuit being composed of a first parallel connection switch and a first resistor connected in series; and a second overvoltage suppression circuit composed of a second series circuit connected to the second coil in parallel, the second series circuit being composed of a second parallel connection switch and a second resistor connected in series. The movable core is driven to a first position through excitation of the first coil by closing the first opening and closing switch, and the movable core is driven to a second position through excitation of the second coil by closing the second opening and closing switch. The second parallel connection switch is opened when the first opening and closing switch is closed. The first parallel connection switch is opened when the second opening and closing switch is closed. Thus, it becomes possible to reduce power loss when a coil is excited.

BEST MODE FOR CARRYING OUT THE INVENTION

Embodiment 1

Figure 1:
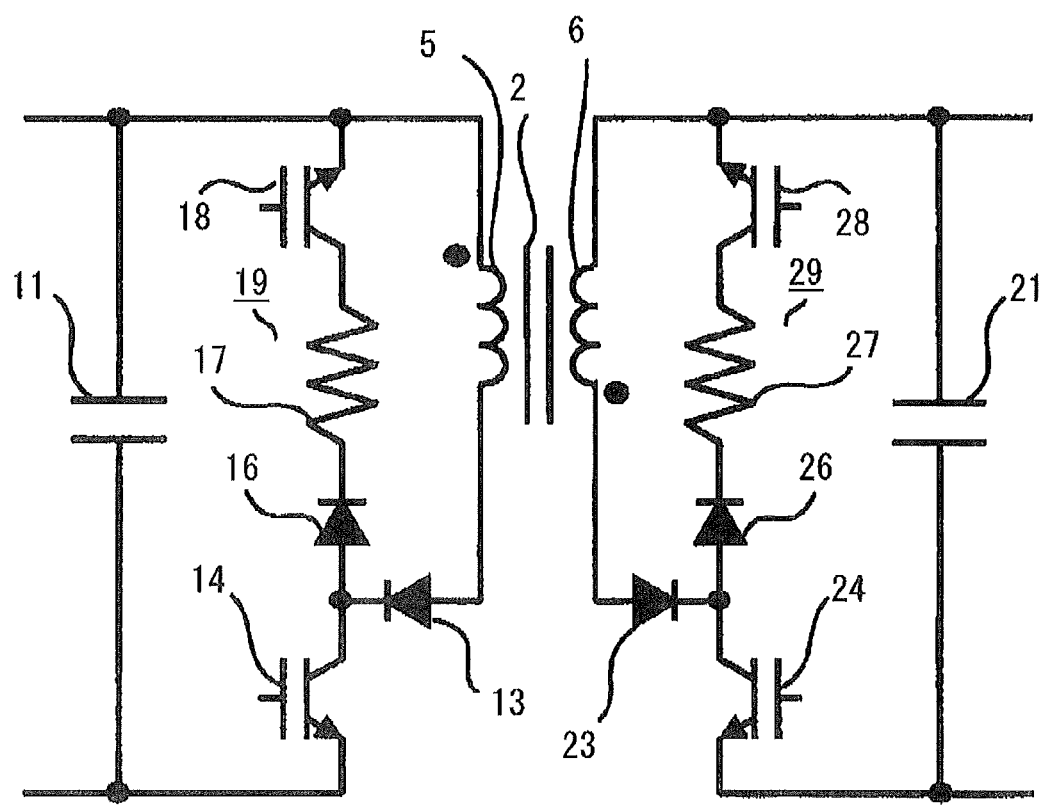
FIG. 1 is a circuit diagram showing the configuration of a drive circuit for an electromagnetic manipulation mechanism according to embodiment 1 of the present invention.
Figure 2:
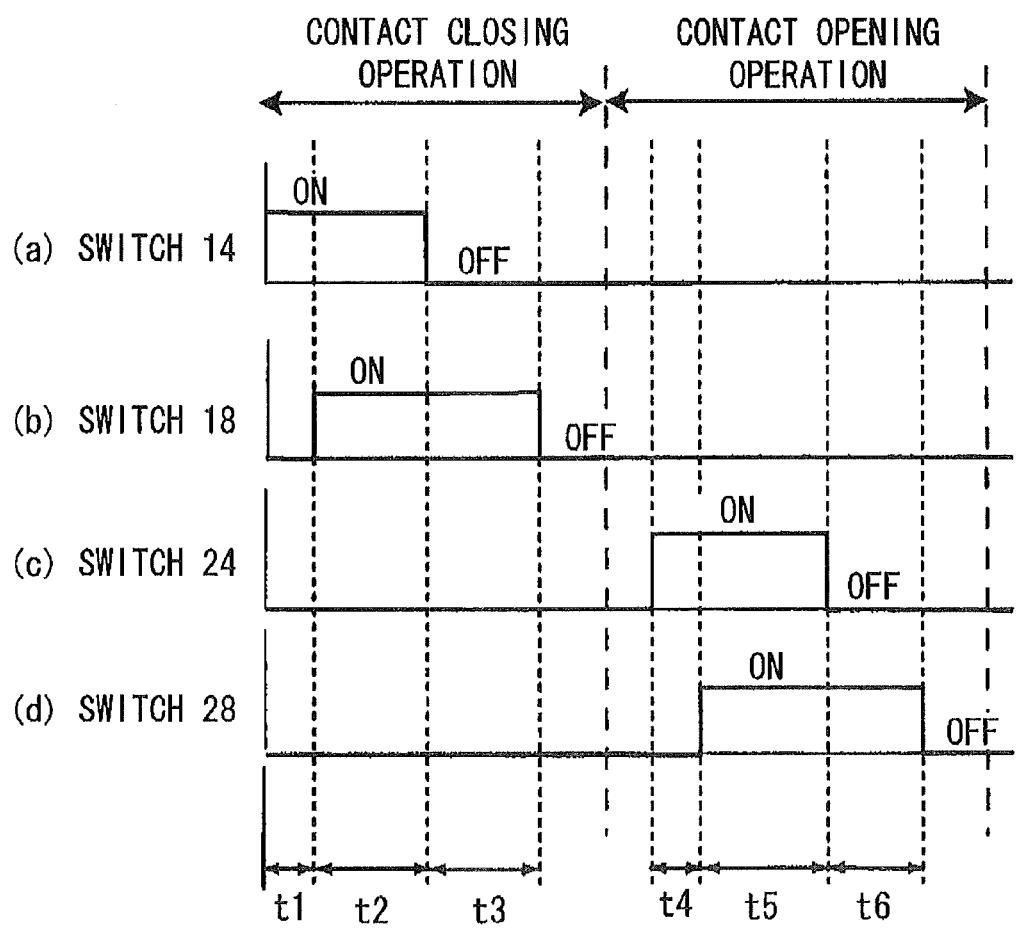
FIG. 2 is a timing chart illustrating the operation of the drive circuit for the electromagnetic manipulation mechanism shown in FIG. 1.

FIG. 1 and FIG. 2 show a drive circuit for an electromagnetic manipulation mechanism according to embodiment 1 of the present invention. FIG. 1 is a circuit diagram showing the configuration of the drive circuit for the electromagnetic manipulation mechanism, and FIG. 2 is a timing chart illustrating the operation of the drive circuit. In FIG. 1, the electromagnetic manipulation mechanism has a movable core, a closing coil 5 as a first coil, and an opening coil 6 as a second coil. Although not shown in detail, the movable core 2 is, for example, a rod-shaped core having a rectangular cross-section and formed of electromagnetic steel sheets laminated, and the coils 5 and 6 which have a loop with rectangular shape are provided on both ends of the movable core 2. When electric current is passed through the coil 5 or the coil 6, the movable core 2 is driven and attracted to a fixed core which is not shown. Thus, the movable core 2 is reciprocated between a first position and a second position to drive a manipulation target coupled to the movable core 2. The manipulation target is, for example, a movable contact fixed to a movable conductor of a vacuum valve of a vacuum circuit breaker. The vacuum valve is opened and closed by reciprocating the movable conductor. It is noted that a mutual inductance between the closing coil 5 and the opening coil 6 is considerably large.

The closing coil 5 is connected to a capacitor 11 functioning as a DC power supply, via a diode 13 and a switch 14 functioning as a first opening and closing switch. The diode 13 is for preventing electric current flowing through the coil 5 from being reversed when the switch 14 is turned on. A series circuit 19, in which a diode 16, a resistor 17, and a switch 18 are connected in series, is connected to the closing coil 5 in parallel. It is noted that, in the present invention, the diode 16 functions as a first unidirectional conduction device, the resistor 17 functions as a first resistor, the switch 18 functions as a first parallel connection switch, and the series circuit 19 functions as a first series circuit and a first overvoltage suppression circuit. The capacitor 11, the diode 13, the switch 14, and the series circuit 19 which are described above form a drive circuit on the closing side. It is noted that field-effect transistors (MOSFET) are used as the switch 14 and the switch 18.

The opening coil 6 is connected to a capacitor 21 functioning as a DC power supply, via a diode 23 and a switch 24 functioning as a second opening and closing switch. The diode 23 is for preventing electric current flowing through the coil 6 from being reversed when the switch 24 is turned on. A series circuit 29, in which a diode 26, a resistor 27, and a switch 28 are connected in series, is connected to the opening coil 6 in parallel. It is noted that, in the present invention, the diode 26 functions as a second unidirectional conduction device, the resistor 27 functions as a second resistor, the switch 28 functions as a second parallel connection switch, and the series circuit 29 functions as a second series circuit and a second overvoltage suppression circuit. The capacitor 21, the diode 23, the switch 24, and the series circuit 29 which are described above form a drive circuit on the opening side. Field-effect transistors (MOSFET) are used as the switch 24 and the switch 28. It is noted that the capacitors 11 and 21 are charged by being supplied with power from a DC power supply which is not shown.

Next, the operation of the drive circuit configured as described above will be described with reference to FIG. 1 and FIG. 2. In the case where electric current is applied from the capacitor 11 on the closing side to the closing coil 5 to close a vacuum valve which is not shown, the switch 14 and the switch 18 on the closing side, and the switch 24 and the switch 28 on the opening side are in off state as shown in FIGS. 2(a) to 2(d). When the switch 14 is turned on (FIG. 2(a)), electric current flows through and excites the closing coil 5. At this time, the switch 24 and the switch 28 are in off state (FIG. 2(d)). Therefore, even if an induced voltage is generated in the opening coil 6, since there is no current path, power loss due to the opening coil 6 does not occur. The switch 18 turns on slightly after, i.e., a predetermined time t1 after the switch 14 has turned on (FIG. 2(b)). The reason why the switch 18 turns on the predetermined time t1 after the switch 14 has turned on is that the circuit that includes the switch 18 has a larger time constant than the circuit that includes the switch 14.

Subsequently, the switch 14 turns off a predetermined time t2 after the switch 18 has turned on (FIG. 2(b)). The switching surge that is generated when the switch 14 turns off is absorbed by a loop circuit composed of the diode 13, the diode 16, the resistor 17, the switch 18, and the closing coil 5. The switch 18 turns off at the moment when electric current flowing through the loop circuit has attenuated and reduced, i.e., a predetermined time t3 after the switch 14 has turned off (FIG. 2(b)).

Similarly, in the case where electric current is applied from the capacitor 21 on the opening side to the opening coil 6 to open the vacuum valve which is not shown, the switch 14 and the switch 18 are in off state as shown in FIGS. 2(a) to 2(d). When the switch 24 is turned on (FIG. 2(c)), electric current flows through and excites the opening coil 6. At this time, the switch 14 and the switch 18 are in off state (FIG. 2(b)). Therefore, even if an induced voltage is generated in the closing coil 5, since there is no current path, power loss due to the closing coil 5 does not occur. The switch 28 turns on slightly after, i.e., a predetermined time t4 after the switch 24 has turned on (FIG. 2(d)). The reason why the switch 28 turns on the predetermined time t4 after the switch 24 has turned on is that the circuit that includes the switch 28 has a larger time constant than the circuit that includes the switch 24.

Subsequently, the switch 24 turns off a predetermined time t5 after the switch 28 has turned on (FIG. 2(c)). The switching surge that is generated when the switch 24 turns off is absorbed by a loop circuit composed of the diode 23, the diode 26, the resistor 27, the switch 28, and the closing coil 6. The switch 28 turns off at the moment when electric current flowing through the loop circuit has attenuated and reduced, i.e., a predetermined time t6 after the switch 24 has turned off (FIG. 2(d)).

Examples of values of the times t1 to t6 are shown below. The values vary depending on, for example, the size of the vacuum valve driven by the movable core 2.

t1: around several ms (a first predetermined time in the present invention)

t2: around 50 ms t3: around 50 ms (a second predetermined time in the present invention)

t4: around several ms (a third predetermined time in the present invention)

t5: around 50 ms t6: around 100 ms (a fourth predetermined time in the present invention)

The drive circuit for the electromagnetic manipulation mechanism according to the present embodiment is configured as described above. In the drive circuit which drives two coils having a mutual inductance, when one coil is excited, there is no current circuit in which electric current is circulated through the other coil that is not excited. Therefore, power loss when a coil is excited can be reduced.

Embodiment 2

Figure 3:
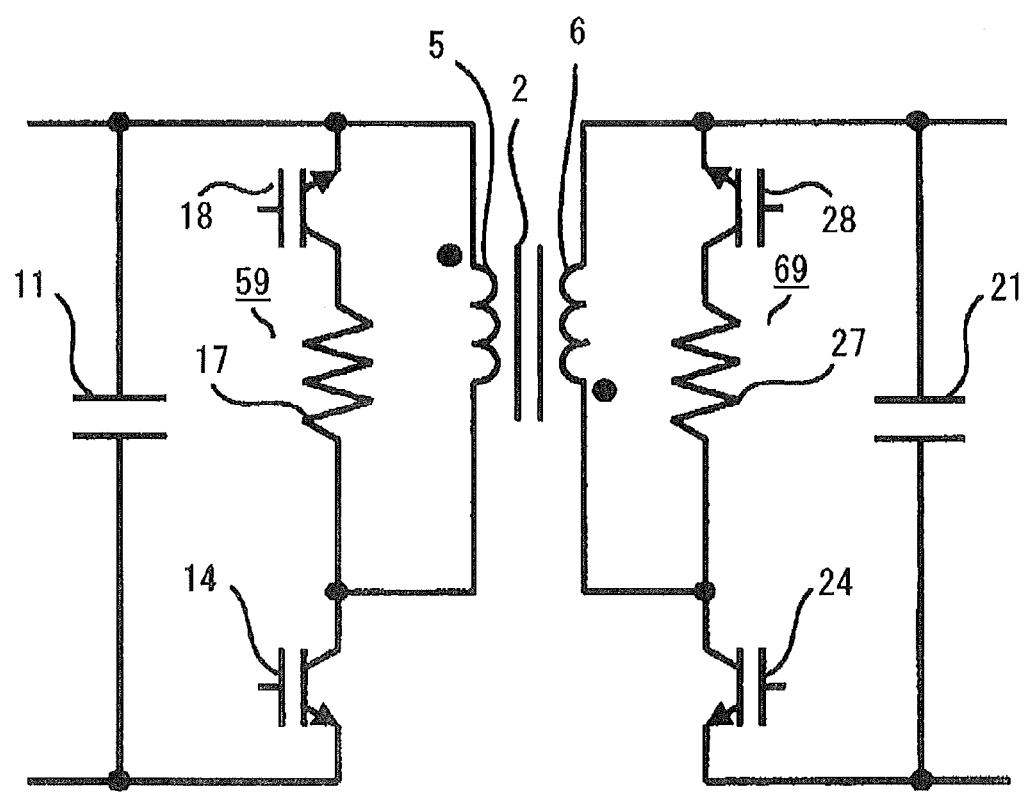
FIG. 3 is a circuit diagram showing the configuration of a drive circuit for an electromagnetic manipulation mechanism according to another embodiment of the present invention.

FIG. 3 is a circuit diagram showing the configuration of a drive circuit for an electromagnetic manipulation mechanism according to embodiment 2. In the present embodiment, some components are removed from the drive circuit for the electromagnetic manipulation mechanism shown in FIG. 1, thus simplifying the configuration. Specifically, in the present embodiment, the diodes 13, 16, 23, and 26 shown in FIG. 1 are removed. A first series circuit 59 functioning as the first overvoltage suppression circuit is composed of the resistor 17 and the switch 18 connected in series. A second series circuit 69 functioning as the second overvoltage suppression circuit is composed of the resistor 27 and the switch 28 connected in series. Also in this case where the diodes 13, 16, 23, and 26 are removed, if the opening and closing timings of the switch 14 and the switch 18, and the opening and closing timings of the switch 24 and the switch 28 are appropriately controlled, increase of power loss can be suppressed. For example, if the timing at which the switch 18 turns on is set to be immediately before the timing at which the switch 14 turns off, power loss in the first series circuit 59, i.e., in the resistor 17 can be minimized, with the circuit being simplified. The same can be said for the opening and closing timings of the switch 24 and the switch 28.

It is noted that, although the above embodiments have been described for the case where the electromagnetic manipulation mechanism is used for opening and closing a vacuum valve of a vacuum circuit breaker, the present invention is not limited thereto. Also in the case where the present invention is applied to an actuator for opening and closing a door, opening and closing a valve, or another operation, the same effect can be provided. Furthermore, although in the above embodiments, a charged capacitor is used as a DC power supply, even if a storage battery or a DC power supply obtained by rectifying an AC is used, the same effect can be provided.

Industrial Applicability

The present invention relates to improvement of a drive circuit for an electromagnetic manipulation mechanism to open and close a valve of a breaker or the like, and is applicable to a wide variety of drive circuits for electromagnetic manipulation mechanisms.

The invention claimed is:

1. A drive circuit for an electromagnetic manipulation mechanism having a movable core coupled to an object to be driven, and first and second coils for driving the movable core, the drive circuit comprising:

first and second opening and closing switches for connecting the first and second coils to DC power supplies, respectively;

a first overvoltage suppression circuit composed of a first series circuit connected to the first coil in parallel, the first series circuit being composed of a first parallel connection switch and a first resistor connected in series; and a second overvoltage suppression circuit composed of a second series circuit connected to the second coil in parallel, the second series circuit being composed of a second parallel connection switch and a second resistor connected in series, wherein the movable core is driven to a first position through excitation of the first coil by closing the first opening and closing switch, and the movable core is driven to a second position through excitation of the second coil by closing the second opening and closing switch, the second parallel connection switch is opened when the first opening and closing switch is closed, the first parallel connection switch is opened when the second opening and closing switch is closed, the first parallel connection switch is closed a first predetermined time after the first opening and closing switch has been closed, and is opened a second predetermined time after the first opening and closing switch has been opened, and the second parallel connection switch is closed a third predetermined time after the second opening and closing switch has been closed, and is opened a fourth predetermined time after the second opening and closing switch has been opened.

2. The drive circuit for the electromagnetic manipulation mechanism according to claim 1, wherein the first series circuit has a first unidirectional conduction device such that the first unidirectional conduction device, the first parallel connection switch, and the first resistor are connected in series, and is connected to the first coil in parallel such that the polarity of the first unidirectional conduction device is opposite to the polarity of the corresponding one of the DC power supplies, and the second series circuit has a second unidirectional conduction device such that the second unidirectional conduction device, the second parallel connection switch, and the second resistor are connected in series, and is connected to the second coil in parallel such that the polarity of the second unidirectional conduction device is opposite to the polarity of the other of the DC power supplies.

3. The drive circuit for the electromagnetic manipulation mechanism according to claim 1, wherein the DC power supplies are a first capacitor and a second capacitor, respectively, that have been charged.

\* \* \* \* \*